(12) United States Patent
Li (10) Patent No.: US 9,614,436 B2
(45) Date of Patent: Apr. 4, 2017

(54) CIRCUIT AND METHOD FOR DYNAMIC SWITCHING FREQUENCY ADJUSTMENT IN A POWER CONVERTER

(71) Applicant: Linear Technology Corporation, Milpitas, CA (US)

(72) Inventor: Jian Li, San Jose, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 427 days.

(21) Appl. No.: 13/963,880

(22) Filed: Aug. 9, 2013

(65) Prior Publication Data

US 2014/0306670 A1    Oct. 16, 2014

Related U.S. Application Data

(60) Provisional application No. 61/810,661, filed on Apr. 10, 2013.

(51) Int. Cl.
*G05F 1/20* (2006.01)
*H02M 3/156* (2006.01)

(52) U.S. Cl.
CPC .... *H02M 3/156* (2013.01); *H02M 2003/1566* (2013.01)

(58) Field of Classification Search
CPC ............................................. H02M 2003/1566
USPC ....... 323/234, 266, 280–285; 326/21, 26–28, 326/30–31, 82–83, 86–87; 327/108–112, 327/122; 365/189.05, 210.1
See application file for complete search history.

(56) References Cited

U.S. PATENT DOCUMENTS

| | | | | | |
|---|---|---|---|---|---|
| 5,250,858 | A | * | 10/1993 | Strong | 326/46 |
| 5,774,002 | A | * | 6/1998 | Guo et al. | 327/165 |
| 6,323,698 | B1 | * | 11/2001 | Fletcher | 327/100 |

(Continued)

FOREIGN PATENT DOCUMENTS

| CN | 101714818 A | 5/2010 |
|---|---|---|
| CN | 101795073 A | 8/2010 |

(Continued)

OTHER PUBLICATIONS

Kamil, Mohammad, Microchip AN1114, Switch Mode Power Supply (SMPS) Topologies (Part 1), Microchip Technology Inc., 2007, pp. 1-48.

(Continued)

*Primary Examiner* — Adolf Berhane
*Assistant Examiner* — Nusrat Quddus
(74) *Attorney, Agent, or Firm* — VLP Law Group LLP; Edward C. Kwok (57) ABSTRACT

A method and a circuit dynamically adjust a frequency of a clock signal that drives the operations of a power converter. The method includes (a) detecting a change from a predetermined value in an output voltage of the power converter; and (b) upon detecting the change, changing the frequency of the clock signal so as to restore the output voltage. The change, such as a load step-up, may be detected by comparing a feedback signal generated from the output voltage and a predetermined threshold voltage. In one implementation, changing the switching frequency is achieved in increasing (e.g., doubling) the frequency of the clock signal, as needed. The frequency of the clock signal need only be changed for a predetermined time period.

10 Claims, 7 Drawing Sheets

(56) References Cited

U.S. PATENT DOCUMENTS

| | | | |
|---|---|---|---|
| 6,366,070 B1* | 4/2002 | Cooke et al. | 323/284 |
| 6,456,561 B2* | 9/2002 | Maeda | 365/189.05 |
| RE39,065 E * | 4/2006 | Nelson | H02M 1/36 323/284 |
| 7,239,575 B2* | 7/2007 | Kim | 365/189.05 |
| 8,797,769 B2* | 8/2014 | Gaknoki et al. | 363/56.09 |
| 2005/0116736 A1* | 6/2005 | Blodgett et al. | 326/30 |
| 2006/0209620 A1* | 9/2006 | Deivasigamani et al. | 365/233 |
| 2008/0112246 A1* | 5/2008 | Mei | 365/210.1 |
| 2008/0224674 A1 | 9/2008 | Hasegawa | |
| 2009/0086513 A1 | 4/2009 | Lombardo et al. | |
| 2009/0102446 A1* | 4/2009 | Takahashi | H02M 3/157 323/283 |
| 2010/0019745 A1* | 1/2010 | Keskar et al. | 323/271 |
| 2011/0121804 A1* | 5/2011 | Kudo | 323/282 |
| 2011/0169471 A1* | 7/2011 | Nagasawa | 323/283 |
| 2012/0013322 A1 | 1/2012 | Dearborn | |
| 2012/0086416 A1* | 4/2012 | Kudo et al. | 323/265 |
| 2013/0063100 A1 | 3/2013 | Henzler | |
| 2013/0127557 A1* | 5/2013 | Houston et al. | 332/112 |

FOREIGN PATENT DOCUMENTS

| | | |
|---|---|---|
| CN | 01888166 A | 11/2010 |
| CN | 101883458 A | 11/2010 |
| CN | 102208875 A | 10/2011 |
| CN | 103081321 A | 5/2013 |
| TW | 201348913 A | 12/2013 |

OTHER PUBLICATIONS

Wang, Mike, Power Supply Design with Fast Transient Response Using V2 Control Scheme, International IC 1999 Conference Proceedings, pp. 189-199.

Linear Technology LTC3829, 3-Phase, Single Output Synchronous Step-Down DC/DC Controller with Diffamp, pp. 1-40, Linear Technology Corporation, Milpitas, CA, 2010, www.linear.com/LTC3829.

Erisman, Brian et al., Modify you switching-supply architecture for improved transient response, www.ednmag.com, Nov. 11, 1999, pp. 91-92, 94, 96-98.

Williams, Jim, Linear Technology Application Note 133, A Closed-Loop, Wideband, 100A Active Load, Oct. 2011, pp. AN133-1-AN133-12, Linear Technology Corporation, Milpitas, CA.

"Testing a power supply for line and load transients" article, pp. 3-9.

Pilawa-Podgurski, Robert C. N., Sagneri, Anthony D., Rivas, Juan M., Anderson, David I., Perreault, David J., Very High Frequency Resonant Boost Converters, 2007 IEEE, pp. 2718-2724.

Ramamurthy Srinivasan, Vanaja Ranjan P., Pulse Skipping Modulated Buck Converter—Modeling and Simulation, Circuits and Systems, 2010, 1, 59-64, Oct. 2010 (www.SciRP.org/journal/cs).

Crane Aerospace & Electronics Power Solutions, Transient Suppression: Switching Power Supplies, Crane Electronics Group, Redmond WA, 2006, pp. 1-12, (www.craneae.com).

Laflin, Michael, High Frequency Implications for Switch-mode DC-DC Converter Design, Enpirion, Inc., Article, 11 pages.

Lehman, Brad & Bass, Richard M., Switching Frequency Dependent Averaged Models for PWM DC-DC Converters, IEEE Transactions on Power Electronics, vol. 11, No. 1, Jan. 1996, pp. 89-98.

Keithley Application Note Series No. 2870, Stabilizing Fast Transient Response Power Supply/Load Circuits, 2007 Keithley Instruments, Inc., 6 pages.

Taiwan Office Action for Application No. 102147154 dated Mar. 10, 2015, 5 pages.

Chinese First Office Action for Chinese Application No. 201410080947.8 dated Jun. 3, 2015, 6 pages.

Taiwan Notice of Allowance for Application No. 102147154 dated Jul. 23, 2015, 2 pages.

Second Chinese Office Action for Application No. 201410080947.8, dated Dec. 7, 2015, 4 pages.

Third Chinese Office Action for Application No. 201410080947.8, dated Jun. 2, 2016, 4 pages.

* cited by examiner

CIRCUIT AND METHOD FOR DYNAMIC SWITCHING FREQUENCY ADJUSTMENT IN A POWER CONVERTER

CROSS-REFERENCE TO RELATED APPLICATIONS

The present application relates to and claims priority of U.S. provisional patent application ("Copending Provisional Application"), Ser. No. 61/810,661, entitled "Dynamic Switching Frequency Adjustment for Fast Transient Response," filed on Apr. 10, 2013. The disclosure of the Copending Provisional Application is hereby incorporated by reference in its entirety.

BACKGROUND OF THE INVENTION

1. Field of the Invention

The present invention relates to a control loop in a power converter. In particular, the present invention relates to dynamically adjusting the switching frequency in a control loop of a power converter to provide a fast response to output transients.

2. Discussion of the Related Art

In a power converter, the output capacitor is a key factor in achieving a high power density. There are two main design considerations for an output capacitor: (a) steady state voltage ripple and (b) voltage spike during a transient. In a conventional power converter, the total output capacitance is mainly designed for transient response. Good transient response is normally achieved by optimizing the bandwidth of the power converter's control loop. However, due to non-linearity, a higher bandwidth does not always result in a better transient response. This can be illustrated, for example, by a peak current mode-controlled power converter.

Figure 1A:
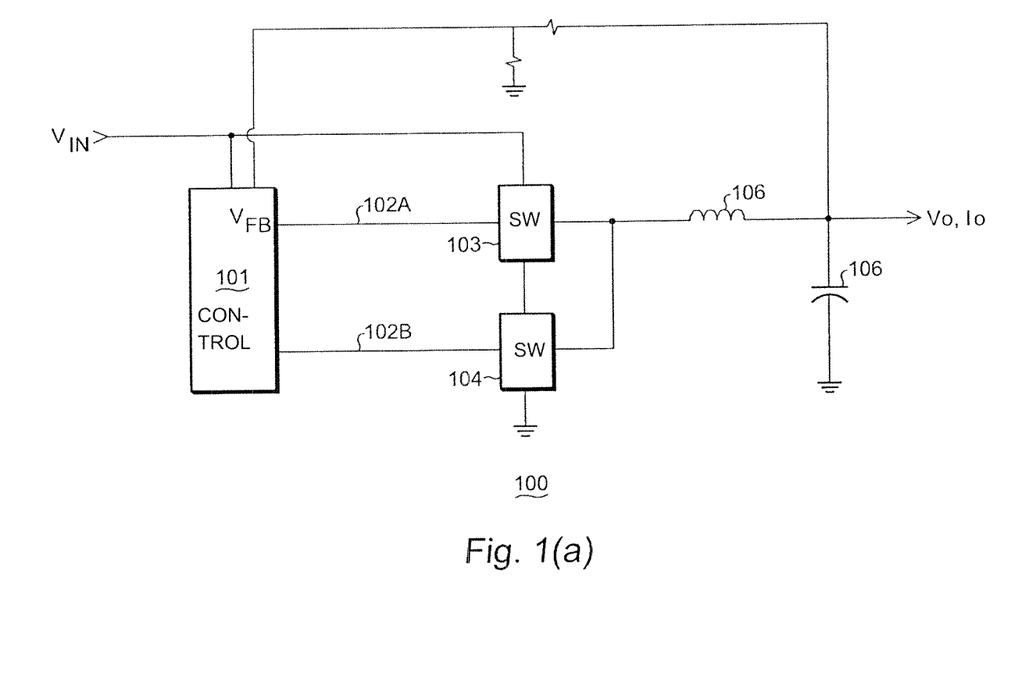
FIG. 1(a) is a schematic diagram showing single-phase circuit configuration 100 for one type of power converter.

FIG. 1(a) is a schematic diagram showing single-phase circuit configuration 100 for one type of power converter. As shown in FIG. 1(a), circuit configuration 100 includes a control module 101 receiving an input voltage $V_{in}$ and providing clock signals 102a and 102b, which drive switch 103 ("top-side switch") and switch 104 ("bottom-side switch"), respectively. The operations of top-side switch 103 and bottom-side switch 104 transfer energy to output capacitor 106 through output inductor 105. Based on feedback signal ($V_{FB}$), control module 101 operates to maintain output voltage $V_O$ at a steady state value. In some power converters, multiple sets of inductors and top-side and bottom-side switches may be used in a "multi-phase" configuration to drive a common output voltage.

Figure 1B:
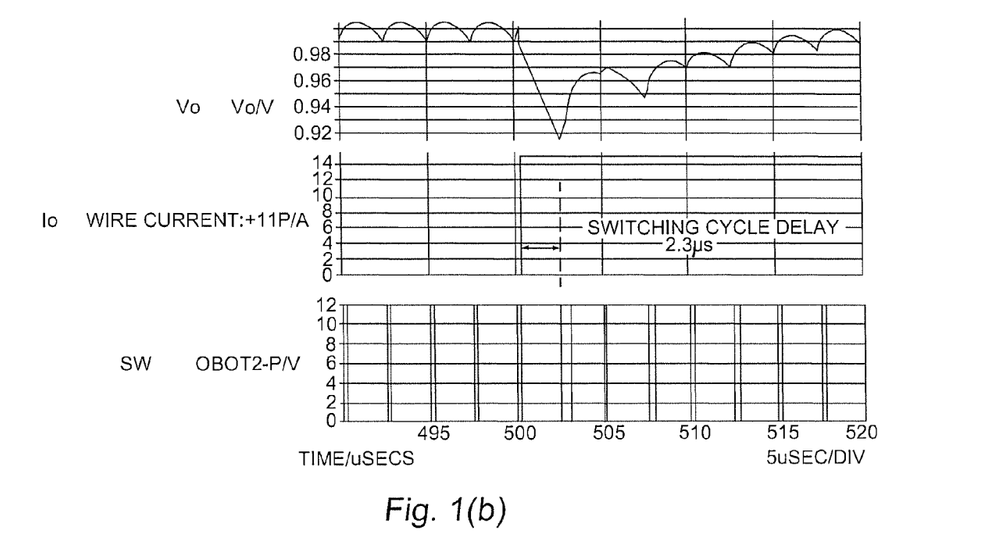
FIG. 1(b) shows the waveforms of output voltage ($V_O$), the output current ($I_O$), and the switching signal that controls the top-side switch of a power converter, in response to a step increase of 15 A load current.

FIG. 1(b) shows the waveforms of output voltage ($V_O$), the output current ($I_O$), and the switching node signal (SW), in response to a step increase in load current of 15 A. In the power converter of FIG. 1(a), the design parameters are: (a) a 12-volt input voltage ($V_{in}$), (b) a 1-volt nominal output voltage ($V_O$), (c) a 400 kHz switching frequency ($f_{SW}$), (d) a 250 nH inductor (L), and (e) a 860 µF output capacitance ($C_{OUT}$), provided by two 330 µF/9 mΩ tantalum polymer capacitors, and two 100 µF/2 mΩ ceramic capacitors. The control loop bandwidth is around 60 kHz with 72° phase margin. As shown in FIG. 1(a), at time t=500 µs, the output load current increases by a 15 A step. Because the step current increase occurs immediately after the top-side switch is turned off, output voltage $V_O$ on the output capacitor drops rapidly to 0.92 volts until the top-side switch turns on again at the beginning of the next switching cycle (t=502.5 µs, about 2.3 µs later). During the switching cycle delay, the feedback control loop provides no help reducing the voltage drop at the output capacitor. The situation is more acute with small duty-cycle operation, as shown in FIG. 1.

A non-linear control scheme may reduce the switching cycle delay. In the non-linear control loop a threshold voltage is selected. When the output voltage falls below the threshold voltage, a voltage undershoot condition is deemed occurred. When the voltage undershoot condition is detected, the top-side switch is immediately turned on, rather than waiting for the beginning of the next switching cycle. There are, however, two drawbacks in this method. First, the monitored threshold voltage is sensitive to both component values and the layout. Second, the nonlinear control scheme may interact with one or more other control loops (e.g., a linear control loop) to create undesired oscillations. These drawbacks introduce unreliability in conventional designs.

SUMMARY

According to one embodiment of the present invention, a method and a circuit dynamically adjust the frequency of a clock signal that drives the operations of a power converter. The method includes (a) detecting a change from a predetermined steady state value in an output voltage of the power converter; and (b) upon detecting the change, changing the frequency of the clock signal so as to restore the output voltage to the predetermined steady state value. The change, such as a load step-up, may be detected by comparing a feedback signal generated from the output voltage and a predetermined threshold voltage. In one implementation, changing the switching frequency is achieved by increasing (e.g., doubling) the frequency of the clock signal, as needed. According to one embodiment of the present invention, the frequency of the clock signal need only be changed for a predetermined time period.

The present invention is better understood upon consideration of the detailed description below in conjunction with the accompanying drawings.

DETAILED DESCRIPTION OF THE PREFERRED EMBODIMENTS

Figure 2:
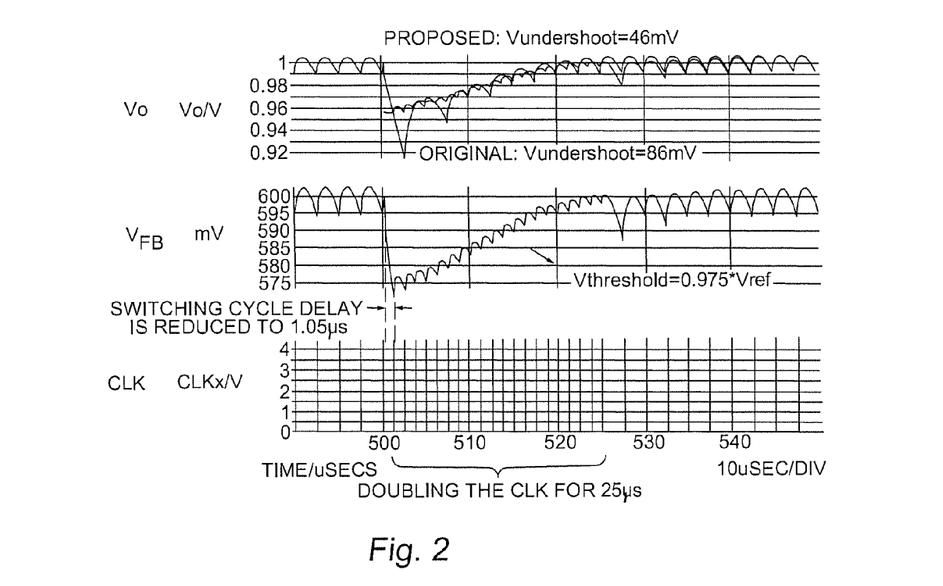
FIG. 2 illustrates a dynamic frequency adjustment scheme for improving transient response, according to one embodiment of the present invention.

According to one embodiment of the present invention, a dynamic switching frequency adjustment scheme improves transient response. FIG. 2 illustrates this dynamic frequency adjustment scheme, according to one embodiment of the present invention. FIG. 2 shows output voltage $V_O$, feedback signal $V_{FB}$, and the switching clock signals of the present invention. Feedback signal $V_{FB}$ may be derived from and may be made proportional to output voltage $V_O$. The methods of the present invention detect a transient change in output voltage $V_O$, such as a voltage undershoot condition. The voltage undershoot condition occurs, for example, when output voltage $V_O$ falls below a threshold voltage, such as during a load "step-up" (i.e., a sharp rise in load current). In the example of FIG. 2, feedback voltage $V_{FB}$ is 0.6V and the threshold voltage is set at 0.975 times $V_{FB}$, or 585 mV. When the voltage undershoot condition is detected, a controller switches to a higher switching frequency, so as to reduce the switching cycle delay. In FIG. 2, the frequency is doubled. As shown in FIG. 2, at the higher switching frequency, the delay between detecting the voltage undershoot condition and the time the top-side switch is turned on (i.e., the switching cycle delay) is reduced from 2.31 µs to 1.05 µs. Consequently, the voltage undershoot is reduced from 86 mV (FIG. 1) to 46 mv, which is approximately a 46% reduction. The higher frequency operation may be maintained for 10 to 20 original switching cycles to ensure output voltage $V_O$ recovers smoothly. Thus, the voltage spike experience during the transient condition is significantly reduced, or equivalently, a smaller output capacitance is required to meet the same transient spike window. The methods of the present invention are equally applicable in multi-phase power converters as in single-phase power converters.

Figure 3A:
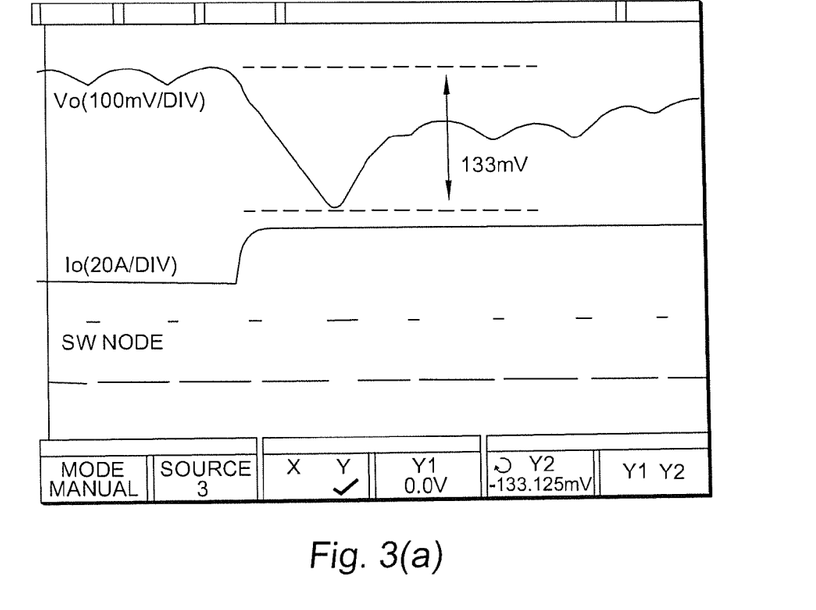
FIGS. 3(a) and 3(b) show the performances of a conventional system and the same system adapted for using a dynamic switching frequency adjustment scheme of the present invention, respectively.
Figure 3B:
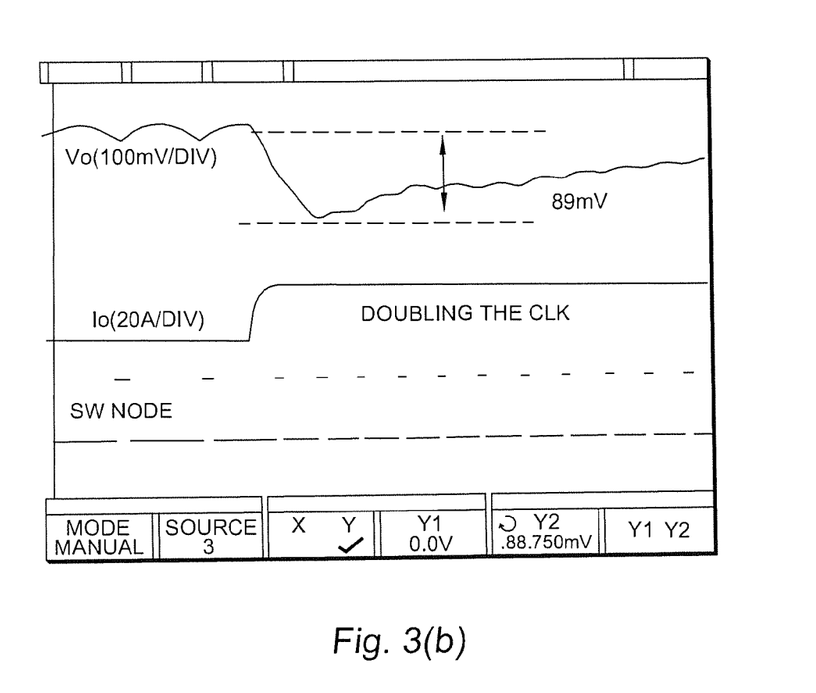

FIGS. 3(a) and 3(b) show the performances of a conventional system and the same system adapted for using the dynamic switching frequency adjustment scheme of the present invention, respectively. The system of FIGS. 3(a) and 3(b) has the following design parameters: (a) a 12-volt input voltage ($V_{in}$), (b) a 1-volt nominal output voltage ($V_O$), (c) a 400 kHz switching frequency ($f_{SW}$), (d) a 330 nH inductor (L), and (e) a 860 µF output capacitance ($C_{OUT}$), provided by two 330 µF/9 mΩ tantalum polymer capacitors, and two 100 µF/2 mΩ ceramic capacitors. As shown in FIGS. 3(a) and 3(b), the voltage undershoot is reduced from 133 mV to 89 mV by doubling the clock frequency for a load current step-up from 0 A to 20 A.

Figure 4A:
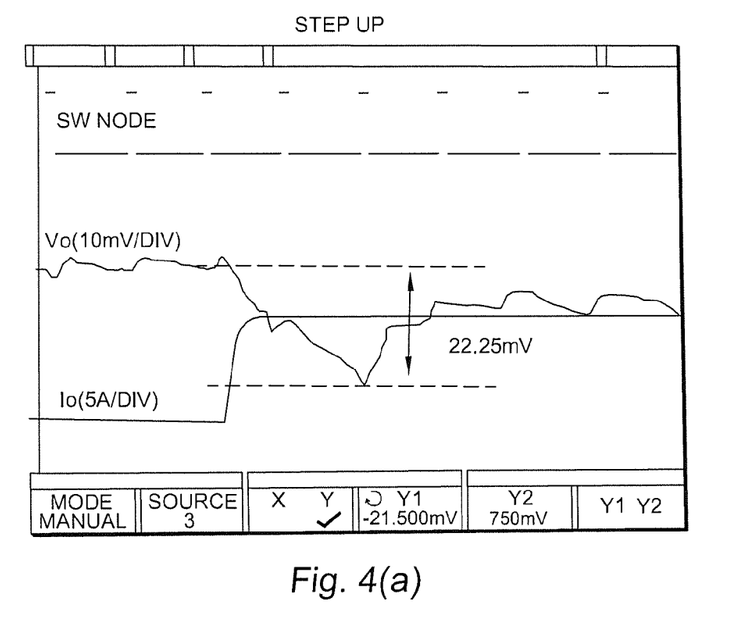
FIGS. 4(a) and 4(b) show the performances of a conventional system during a 10 A load current step-up and a 10 A load current step-down, respectively.
Figure 4B:
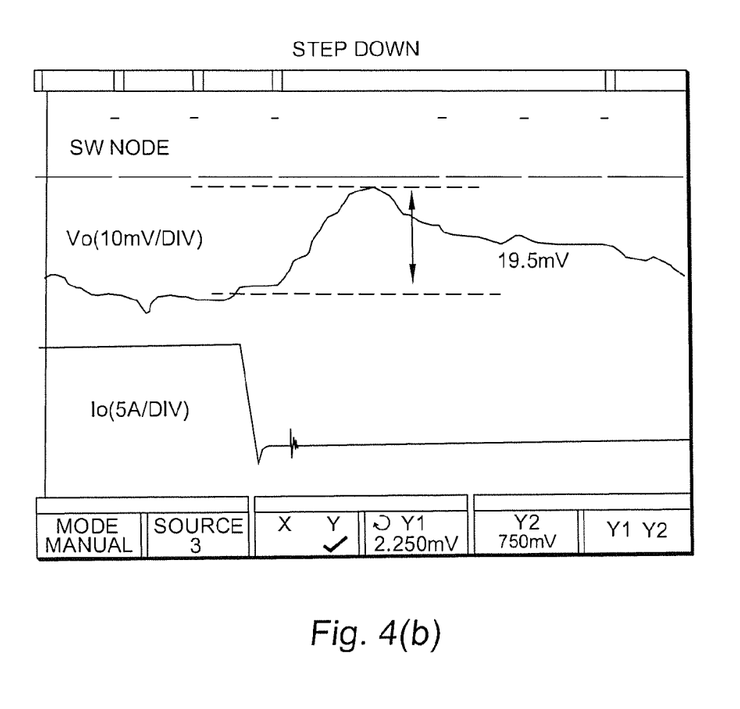

As discussed above, the methods of the present invention allow the same design specification to be achieved with a lesser output capacitance requirement. For example, FIGS. 4(a) and 4(b) show the performances of a conventional system during a 10 A load current step-up and a 10 A load current step-down, respectively. This conventional system uses peak current mode control. The design specification for that conventional system is: (a) a 12-volt input voltage ($V_{in}$), (b) a 1-volt nominal output voltage ($V_O$), (c) a 400 kHz switching frequency ($f_{SW}$), and (d) a 40 mV peak-to-peak voltage ($V_{pp}$) limit for 10 A step-up and 10 A step-down in load currents. In the example of FIGS. 4(a) and 4(b), these specifications are substantially satisfied by a 330 nH inductor (L), and a 2220 µF output capacitance ($C_{OUT}$), which was provided by four 330 µF/6 µmΩ tantalum polymer capacitors, and nine 100 µF/2 mΩ ceramic capacitors. As seen in FIGS. 4(a) and 4(b), a 22.25 mV negative voltage spike is experienced during a 0 to 10 A step-up in load current, and a 19.5 mV during a 10 A to 0 A step-down in load current, thus providing a total peak-to-peak voltage spike of 41.75 mA.

Figure 5A:
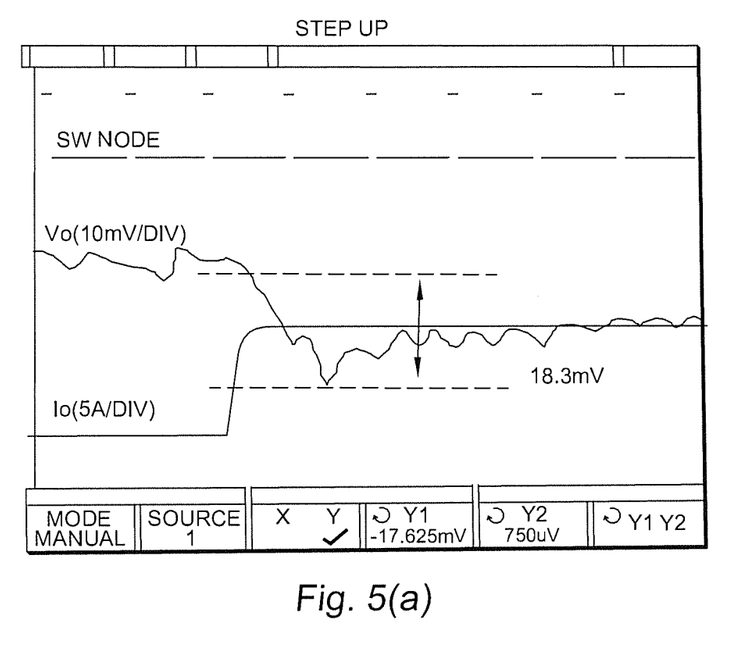
FIGS. 5(a) and 5(b) show the operations of a system using a dynamic switching frequency adjustment scheme of the present invention that substantially meets the design specifications of the conventional system of FIGS. 4(a) and 4(b) under a 0 A-to-10 A step-up and under 10 A-to-0 A step-down in load current, respectively.
Figure 5B:
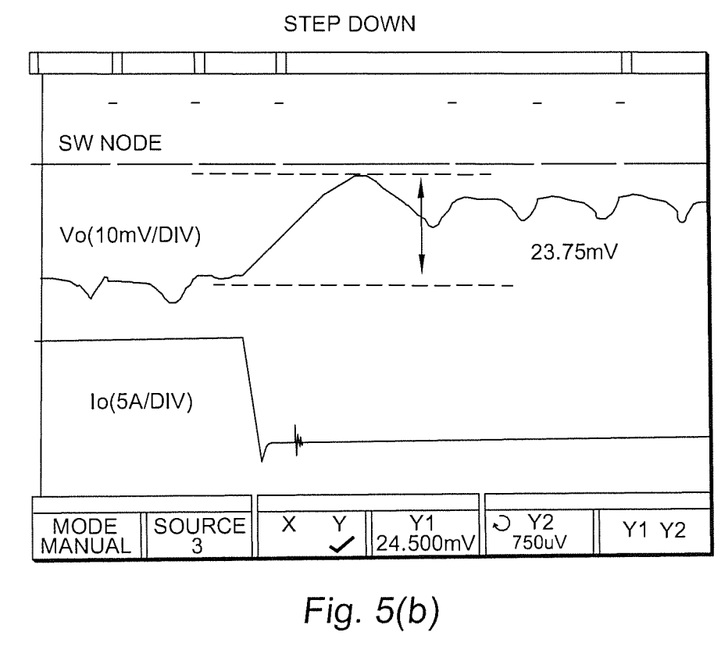

The design specification of the conventional system of FIGS. 4(a) and 4(b) may be met using a dynamic switching frequency adjustment scheme of the present invention with a lesser requirement on the output capacitance. FIGS. 5(a) and 5(b) show the operations of such a system under a 0 A-to-10 A step-up and under 10 A-to-0 A step-down in load current, respectively. In the example of FIGS. 5(a) and 5(b), the switching frequency is doubled, when a voltage undershoot condition (i.e., load current step up) is detected, and halved, when a voltage overshoot condition is detected (i.e., load current step-down) is detected. In FIGS. 5(a) and 5(b), a 18.3 mV negative voltage spike is experienced during a 0 to 10 A step-up in load current, and a 23.75 mV during a 10 A to 0 A step-down in load current, thus providing a total peak-to-peak voltage spike of 42.05 mA. The specification is met by a 330 nH inductor (L), and a 1720 µF output capacitance ($C_{OUT}$), which was provided by four 330 µF/6 mΩ tantalum polymer capacitors, and four 100 µF/2 mΩ ceramic capacitors, which represents a reduction of output capacitance by 23%. Fewer ceramic capacitors also save significant cost. Further, as compared to the conventional nonlinear control method described above, a power converter using a dynamic switching frequency adjustment scheme of the present invention need only run in a linear control loop. Consequently, there is no concern related to interactions between a nonlinear control loop and a linear control loop, so that transient recovery can occur smoothly.

Figure 6:
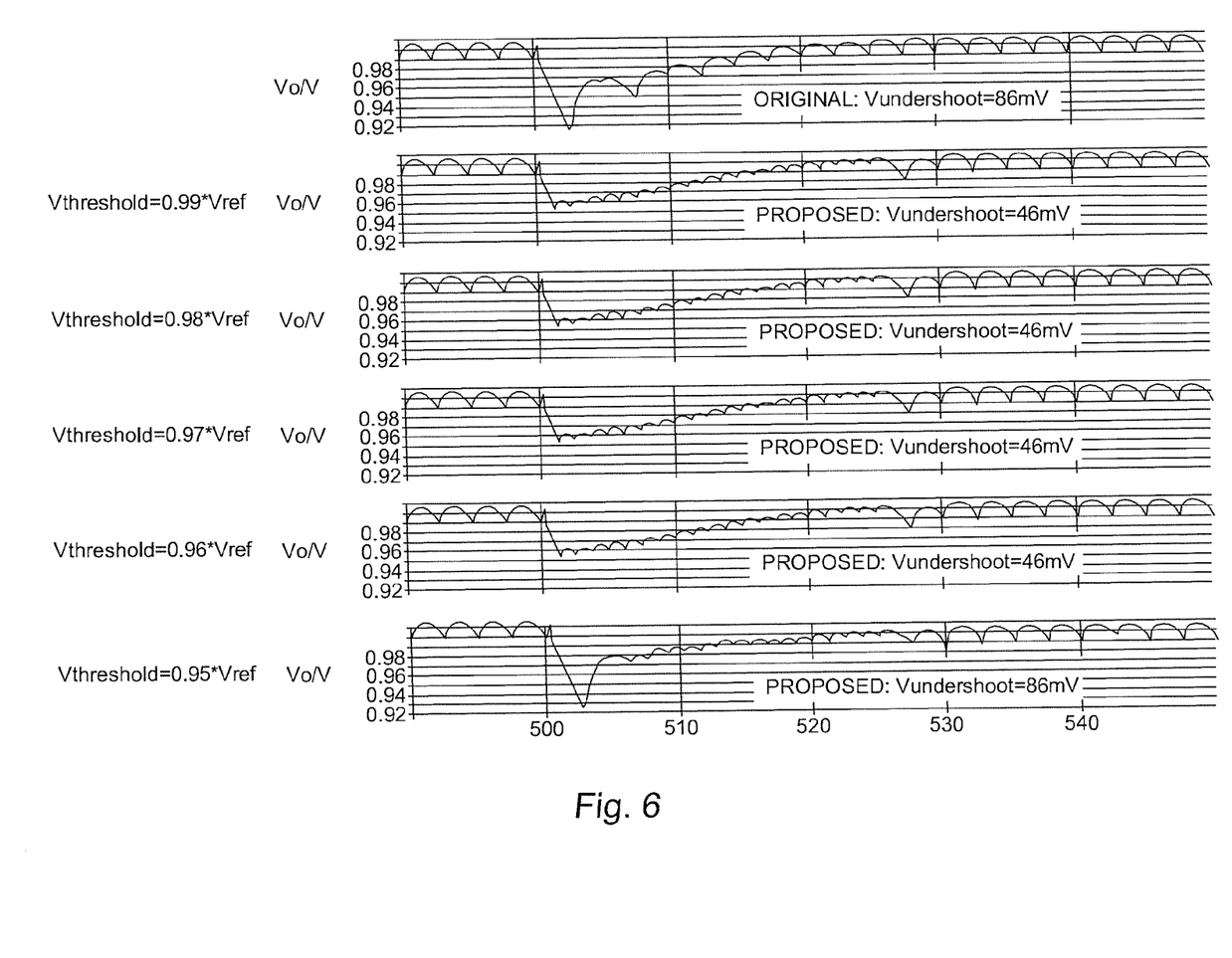
FIG. 6 shows the voltage spike reductions for various threshold values, in accordance with one embodiment of the present invention.

An additional advantage of a system using a method of the present invention is its relative insensitivity to threshold setting. FIG. 6 shows the voltage spike reductions for threshold values that are set from 0.99 times of reference voltage $V_{ref}$ to 0.95 times reference voltage $V_{ref}$. Reference voltage $V_{ref}$ may be set to, for example, 0.6V. As shown in FIG. 6, for a 10 A load current step-up, doubling the switching frequency provides the same performance improvement (i.e., a voltage spike reduction from 86 mV to 46 mV) over the range of threshold voltages between $0.96*V_{ref}$ and $0.99*V_{ref}$.

Figure 7A:
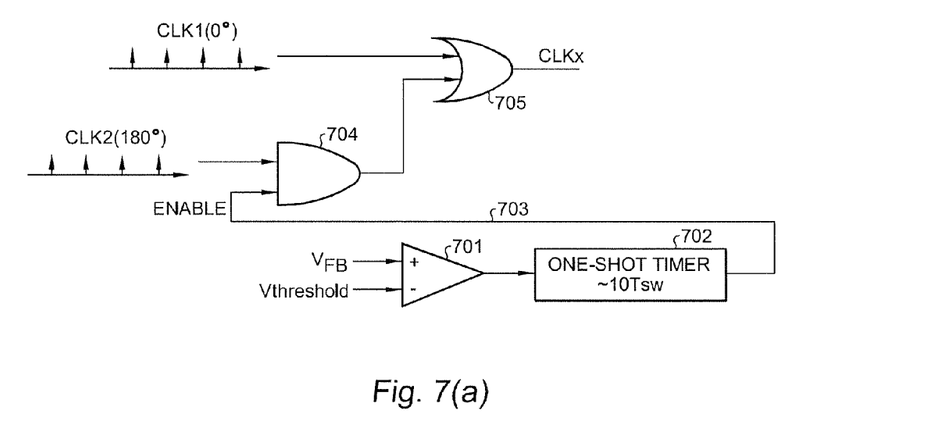
FIG. 7(a) shows clock circuit 700 which provides a clock signal for dynamically adjusting the switching frequency of a power converter for a load step-up, in accordance with one embodiment of the present invention.
Figure 7B:
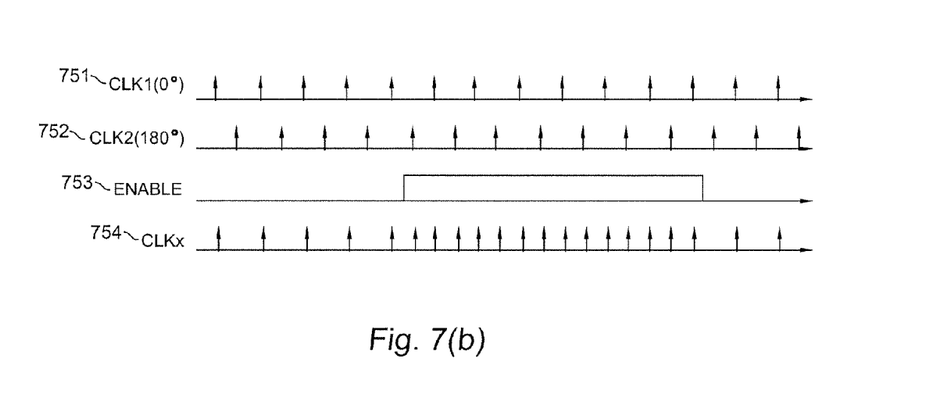
FIG. 7(b) shows selected signals of circuit 700 for implementing the dynamically adjusted switching frequency scheme.

FIG. 7(a) shows clock circuit 700 which provides a clock signal for dynamically adjusting the switching frequency of a power converter for a load step-up, in accordance with one embodiment of the present invention. FIG. 7(b) shows selected signals of circuit 700 for implementing the dynamically adjusted switching frequency scheme. As shown in FIG. 7(a), circuit 700 receives (i) feedback signal $V_{FB}$, representative of output voltage $V_O$, (ii) threshold voltage $V_{threshold}$, and (iii) clock signals CLK1 and CLK2 of the same frequency, but separated in phase by a 180°. The waveforms of clock signals CLK1 and CLK2 are shown as waveform 751 and 752 in FIG. 7(b). When comparator 701 detects a load step-up condition, which occurs when $V_{FB}$ falls below threshold voltage $V_{threshold}$, its output signal triggers one-shot timer 702 to provide a pulse in enable signal 703. The pulse in enable signal 703 has a duration spanning about 10 cycles of clock signal CLK1. Enable signal 703 is shown as waveform 753 in FIG. 7(b). Enable signal 703 causes clock signal CLK2 to be merged by AND gate 704 and OR gate 705 with clock signal CLK1 to provide output clock signal CLKx. The waveform of output clock signal CLKx is shown as waveform 754 in FIG. 7(*b*). As shown in FIG. 7(*b*), in waveform 754, the frequency of output clock signal CLKx is doubled during the duration of the pulse in enable signal 703.

The above detailed description is provided above to illustrate specific embodiments of the present invention and is not intended to be limiting. Numerous modifications and variations within the scope of the present invention are possible. The present invention is set forth in the accompanying claims.

I claim:

1. A method for dynamically adjusting a frequency of a clock signal that determines a switching frequency of one or more switches in a power converter, comprising:
   detecting a change from a predetermined steady state value in an output voltage of the power converter and indicating the change by an enable signal of a predetermined duration; and
   upon receiving the enable signal, doubling the frequency of the clock signal by combining in time the clock signal with its complement for the predetermined duration, so as to increase the switching frequency of the switches, thereby restoring the output voltage to the predetermined steady state value.

2. The method of claim 1, wherein detecting the change comprises comparing a feedback signal generated from the output voltage and a predetermined threshold voltage.

3. The method of claim 1, wherein the change comprises a load step-up.

4. The method of claim 1, wherein the change comprises a load step-down.

5. The method of claim 1, wherein the power converter is a multi-phase power converter.

6. A circuit for dynamically adjusting a frequency of a clock signal that determines a switching frequency of one or more switches in a power converter, comprising:
   detector circuit which indicates a change from a predetermined steady state value in an output voltage of the power converter by generating an enable signal of a predetermined duration; and
   frequency adjusting circuit including a frequency doubler circuit which, upon the frequency adjustment circuit receiving the enable signal, is enabled to double the frequency of the clock signal by combining in time the clock signal with its complement for the predetermined duration, so as to increase the switching frequency of the switches, thereby restoring the output voltage to the predetermined steady state value.

7. The circuit of claim 6, where the detector circuit compares a comparator that compares a feedback signal generated from the output voltage and a predetermined threshold voltage.

8. The circuit of claim 6, wherein the change comprises a load step-up.

9. The circuit of claim 6, further comprising a one-shot circuit which, upon detecting the change, provides the pulse of the predetermined duration during which to carry out doubling of the clock signal.

10. The circuit of claim 7, wherein the power converter is a multi-phase power converter.

* * * * *